Dec. 16, 1952 DE WITT T. GREENE 2,621,659
VEGETABLE POD OPENER AND SHELLER
Filed Nov. 1, 1950
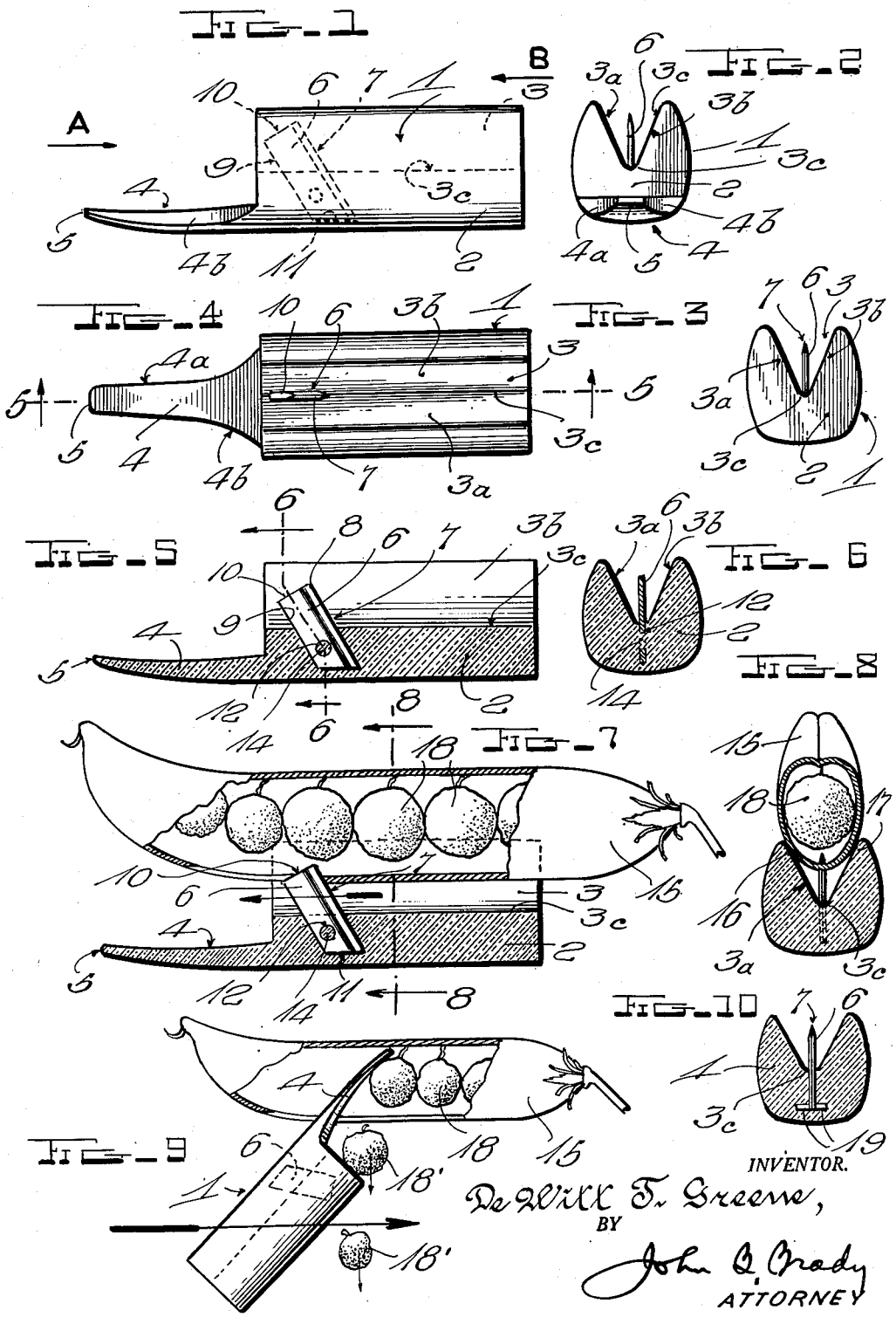
INVENTOR.
De Witt T. Greene,
BY
John Q. Brady
ATTORNEY Patented Dec. 16, 1952

2,621,659

UNITED STATES PATENT OFFICE 2,621,659

VEGETABLE POD OPENER AND SHELLER

De Witt T. Greene, Brunswick, Ga.

Application November 1, 1950, Serial No. 193,479

8 Claims. (Cl. 130—30)

My invention relates broadly to cutlery and more particularly to an opener and sheller for pod-like vegetables.

One of the objects of my invention is to provide a hand manipulated device for facilitating the opening and shelling of vegetables of the pod-like variety.

Another object of my invention is to provide a construction of hand manipulated device for opening and shelling pod-like vegetables such as green peas and beans in which the device is composite in structure and includes a pod-slitting portion and a pod-clearing portion.

Still another object of my invention is to provide a construction of opener and sheller for pod-like vegetables which is readily manipulated by hand for rapidly slitting the vegetable pod by movement in one direction and subsequently dislodging the vegetable from the pod by movement in an opposite direction.

Still another object of my invention is to provide a construction of opener and sheller for pod-like vegetables having a body portion longitudinally recessed to permit the entry of a vegetable pod and provided with a cutting blade disposed centrally of the recess for slitting the pod, with one end of the body portion terminating in a tapered prong which is insertable through the slitted pod and which is adapted to be raked down the length of the pod for rapidly dislodging the contents thereof.

Other and further objects of my invention reside in a simplified construction of hand manipulated opener and sheller for pod-like vegetables as set forth more fully in the specification hereinafter following by reference to the accompanying drawings in which:

Figure 1 is a side elevational view of the pod opener and sheller constructed in accordance with my invention; Fig. 2 is an end view looking in the direction of arrow A of Fig. 1; Fig. 3 is an end view looking in the direction of arrow B in Fig. 1; Fig. 4 is a top plan view showing more clearly the recess in the body portion of the opener and sheller and the prong for severing the vegetables from the inside of the pod; Fig. 5 is a vertical sectional view taken on line 5—5 of Fig. 4; Fig. 6 is a vertical sectional view taken on line 6—6 of Fig. 5; Fig. 7 illustrates the device of my invention in use for slitting a pod-like vegetable such as a pea-pod, the pod being moved longitudinally of the device in the direction of the arrow so that the blade functions to slit the pod but without cutting the contents hereof; Fig. 8 is a verical sectional view taken substantially on line 8—8 of Fig. 7; Fig. 9 shows the device of my invention in operation as a sheller with the elongated prong thereof extending through the slitted pod and manipulated for severing the vegetables from the inside of the pod; and Fig. 10 shows in cross-sectional view a modified form of means for securing the blade within the body portion of the shelling device.

My invention is directed to a composite opener and sheller for pod-like vegetables which is readily manipulated by hand for rapidly slitting and removing the vegetables from the pods. The device of my invention includes a body portion and an elongated tapered sheller prong connected therewith. The body portion of the device has a longitudinally extending recess therein within which there is located a slitting blade of such length that when a pod-like vegetable such as a bean or a pea is drawn longitudinally through the recess the pod is supported tangentially with respect to the interior walls of the recess and is longitudinally slitted by the blade without cutting the beans or peas within the pod. The device is then moved into a position into which the prong may be inserted through the slitted opening in the pod and manipulated in the direction of the arrow along the length of the bean or pea for severing the beans or peas from the interior of the pod. It is estimated that by utilizing the device of my invention, it is possible to shell such vegetables as beans or peas at least five times as rapidly as can be done by hand without the use of the device. The construction is simple, inexpensive and sanitary.

Referring to the drawings in more detail reference character 1 designates the body structure of the device of my invention which may be molded from glass, plastic, wood or metal, such as aluminum. The body portion in the particular form of my invention illustrated is substantially ovate in contour but it will be understood that the contour may be modified to facilitate molding and include a flat base portion with upwardly projecting sides slightly inclined toward each other. The body structure 1 includes a solid central portion 2 the upper part of which is provided with a V-shaped recess 3. The solid central portion 2 of the device is provided with an elongated curved and tapered integrally connected sheller prong 4 on one end thereof. The sheller prong 4 has curved tapered sides 4a and 4b which terminate in a substantially flat rectangular tip or terminus 5. The prong 4 is contiguous with the surface of the body structure 1 opposite the recess 3.

The recess 3 has the inwardly inclined surfaces 3a and 3b thereof terminating in a longitudinally extending apex 3c. Adjacent the end of the body structure 1 which connects with prong 4 and aligned with the longitudinally extending apex 3c of the recess 3 I mount a slitting blade 6. The slitting blade 6 is substantially of trapezium shape having a slitting edge 7 at one side thereof, a slitting tip 8 at the extremity thereof, a rearward parallel extending edge 9 opposite slitting edge 7, a terminating end 10 which is at right angles to edges 7 and 9 and a terminating end surface 11 which is non-parallel to the terminating end 10. I provide a perforation 12 in blade 6 adjacent the terminating end surface 11. In the production of the device of my invention the blade 6 is set in a position in which the terminating end surface 11 is substantially parallel to the rear terminating surface 1a of the body structure 1 and in a position in which the glass or plastic forming the body structure 1 is cast around the blade with the glass or plastic extending through the perforation 12 in the blade for keying the blade to the body structure 1. The blade 6 is so mounted in body structure 1 that slitting edge 7 is inclined at an obtuse angle with respect to the longitudinal apex 3c relative to the approach direction of the pod through the recess. Thus the slitting edge 7 and slitting tip 8 of the blade extend in a plane coplanar with a plane through the longitudinally extending apex portion 3c of body structure 1, in a position facilitating shirring of the vegetable pod as the pod is moved against the inclined blade.

In Fig. 7 I have shown the manner in which a bean or pea pod is moved longitudinally through the device of my invention where the pod 15 is held in one hand and the device of my invention held in the other hand. The bean or pea pod 15 is moved in the direction of the arrow shown in Fig. 7 with the sides of the pod tangent to the surfaces 3a and 3b of the V-shaped recess 3. In Fig. 8 I have shown more clearly the manner in which the pod 15 contacts the surfaces 3a and 3b of the recess 3 and is tangent thereto the point 16 and 17 thereby restricting the entry of the pod into the V-shaped recess 3 slitting tip 8 and slitting edge 7 of the blade 6 to enter the pod sufficiently to slit the pod but not cut the beans or peas therein represented at 18.

In Fig. 9 I have shown the device of my invention manipulated in a reverse direction with the prong 4 thereof introduced through the slit prepared by the slitting blade in the side wall of the pod 15 for scraping the vegetables such as beans or peas 18 from the interior of the pod. In Fig. 9 I have shown the peas 18 being sheared from the interior of the pod 15 by manipulating the prong 4 through the slitted pod so that the peas drop from the pod as indicated at 18' to be caught in a suitable container.

In Fig. 10 I have shown a modified form of my invention in which the blade 6 is stabilized by perforations 19 struck from the rear end of the blade and extending into the cast material for appropriately keying the blade 6 with the body structure 1.

I have found the device of my invention highly practical in manufacture and production and successful in operating. I realize, however, that modifications may be made and I desire that it be understood that no limitations upon my invention are intended other than may be imposed by the scope of the appended claims.

What I claim as new and desire to secure by Letters Patent of the United States are as follows:

1. A device for opening and shelling pod-like vegetables, a manually manipulatable body structure having a substantially V-shaped recess extending longitudinally of the front thereof and a tapered prong integrally connected with one end thereof and coextensive with the back of said body structure, a slitting blade disposed in coplanar alignment with the longitudinal apex of the V-shaped recess in a position intermediate the connection of said body structure with said prong whereby a pod-like vegetable drawn through said V-shaped recess may be slitted and said body structure manually moved into a position in which said prong is introduced through the slit for severing the vegetables from the interior of the pod.

2. A device for opening and shelling pod-like vegetables comprising a longitudinally extending manually manipulatable body structure having a solid central portion and a tapered prong integral with one end thereof, a longitudinally extending linear recess in said body structure symmetrical throughout its length for receiving and guiding a pod-like vegetable therethrough, a slitting blade mounted in said recess body structure coplanar with the longitudinal axis of the recess therein, said blade operating to slit a vegetable pod as the pod is drawn longitudinally through the recess and said prong being operative by manual manipulation of said body structure for insertion through the slitted pod for the removal of the vegetables from the interior of the pod.

3. A device for opening and shelling pod-like vegetables as set forth in claim 2 in which said blade is perforated at the position at which the blade is mounted in said body structure and is keyed to the solid central portion of said body structure by the material of said solid central portion which extends through the perforation in the blade.

4. A device for opening and shelling pod-like vegetables as set forth in claim 2 in which said blade is wholly confined within the limits of said body structure and is of trapezium shape and has a slitting edge inclined at an obtuse angle with the longitudinal axis through the bottom of the recess in said solid central portion of said body structure on the side thereof remote from the connection of said prong with the solid central portion of the device.

5. A device for opening and shelling pod-like vegetables as set forth in claim 2 in which said blade is provided with outstruck projections forming a keying means between said blade and said solid central portion of said body structure at the position at which the blade is mounted in said body structure.

6. A device for opening and shelling pod-like vegetables as set forth in claim 2 in which said blade is proportioned in length with respect to the side walls of the recess so that the vegetable pod establishes substantially linear tangential contact with opposite walls of the recess throughout the length thereof and is spaced from the bottom of the recess as the pod moves longitudinally through the recess for such distance that the slitting blade slits the pod of the pod-like vegetable which is moved longitudinally through the recess sufficiently spaced away from the vegetables within the pod to avoid cutting thereof.

7. A device for opening and shelling pod-like vegetables comprising a longitudinally extending body structure having a solid central portion and a tapered prong contiguous with one end thereof, a longitudinally extending recess in said body structure for receiving and guiding a pod-like vegetable therethrough, a slitting blade mounted in said recess coplanar with the longitudinal axis thereof, said blade operating to slit a vegetable pod as the pod is drawn longitudinally through the recess and said prong being operative for insertion through the slitted pod for the removal of the vegetables from the interior of the pod, said tapered prong being provided with opposite curved sides extending from said solid central portion to the tip of the prong and where the tip of the prong is of substantially flat rectangular contour constituting a severing means.

8. A device for opening and shelling pod-like vegetables comprising a body structure having a solid back portion and a central portion having a recess extending longitudinally of the length of the side opposite said back portion and an integrally connected prong extending from one end of the solid portion substantially coplanar with the back portion thereof and displaced from the recess in said solid central portion, a slitting blade carried by the solid central portion of said body structure in a position adjacent the end thereof which connects with said prong, said blade being mounted in said solid central portion on an obtuse angle with respect to the direction of introduction of the pod into the recess in said solid central portion of the body structure whereby pod drawn through the recess is slitted in preparation for the introduction of said prong therethrough for removal of the vegetables from the interior of the pod.

DE WITT T. GREENE.

REFERENCES CITED

The following references are of record in the file of this patent:

UNITED STATES PATENTS

| Number | Name | Date |
| --- | --- | --- |
| 717,998 | Huebner | Jan 6, 1903 |
| 2,528,402 | Watson | Oct 31, 1950 |

FOREIGN PATENTS

| Number | Country | Date |
| --- | --- | --- |
| 373,447 | Great Britain | May 26, 1932 |